(12) United States Patent
Kotera

(10) Patent No.: US 10,792,751 B2
(45) Date of Patent: Oct. 6, 2020

(54) TEACHING SYSTEM AND TEACHING METHOD OF WELDING ROBOT

(71) Applicant: FANUC CORPORATION, Yamanashi (JP)

(72) Inventor: Shun Kotera, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 128 days.

(21) Appl. No.: 15/951,862

(22) Filed: Apr. 12, 2018

(65) Prior Publication Data

US 2018/0304391 A1 Oct. 25, 2018

(30) Foreign Application Priority Data

Apr. 25, 2017 (JP) .................... 2017-086317

(51) Int. Cl.
| | |
|---|---|
| B23K 9/09 | (2006.01) |
| B23K 9/095 | (2006.01) |
| B23K 9/127 | (2006.01) |
| B23K 9/12 | (2006.01) |
| B23K 9/235 | (2006.01) |
| B23K 9/173 | (2006.01) |
| G05B 19/425 | (2006.01) |

(52) U.S. Cl.
CPC ............ *B23K 9/0953* (2013.01); *B23K 9/126* (2013.01); *B23K 9/1278* (2013.01); *B23K 9/173* (2013.01); *B23K 9/235* (2013.01); *G05B 19/425* (2013.01); *G05B 2219/45104* (2013.01)

(58) Field of Classification Search
CPC .... B23K 9/0953; B23K 9/126; B23K 9/1278; B23K 9/173; B23K 9/235; G05B 19/425; G05B 2219/45104
See application file for complete search history.

(56) References Cited

U.S. PATENT DOCUMENTS

| | | | | |
|---|---|---|---|---|
| 4,249,062 A | * | 2/1981 | Hozumi ................... | B23K 9/12 219/124.22 |
| 4,831,316 A | * | 5/1989 | Ishiguro ............... | G05B 19/425 318/573 |

(Continued)

FOREIGN PATENT DOCUMENTS

| | | |
|---|---|---|
| AT | 510886 A1 | 7/2012 |
| CN | 1771108 A | 5/2006 |

(Continued)

*Primary Examiner* — Ibrahime A Abraham
*Assistant Examiner* — Frederick F Calvetti
(74) *Attorney, Agent, or Firm* — RatnerPrestia

(57) ABSTRACT

A teaching system rewinds a welding wire in accordance with a detection that a tip of a welding wire contacts a teach subject, and feeds the welding wire in accordance of a non-detection that the tip of the welding wire contacts the teach subject. Furthermore, the teaching system, if a current protruding length of the welding wire is less than a predetermined length, moves a robot in a direction away from the teach subject, and, if the current protruding length is greater than the predetermined length, moves the robot in a direction closer to the teach subject. The teaching system, if a determination that the current protruding length is equal to the predetermined length, stops feeding and rewinding of the welding wire and stops the robot, and stores a stop position of the robot as a teaching position.

3 Claims, 6 Drawing Sheets

(56) References Cited

U.S. PATENT DOCUMENTS

| | | | | |
|---|---|---|---|---|
| 5,006,999 A * | 4/1991 | Kuno | ............... | G05B 19/425 219/124.34 |
| 5,399,837 A * | 3/1995 | Mangelsen | ............ | B23K 9/32 219/125.1 |
| 5,630,955 A * | 5/1997 | Kosaka | ............. | B23K 9/0672 219/125.1 |
| 5,916,464 A * | 6/1999 | Geiger | ............ | B23K 9/1336 219/130.4 |
| 6,160,241 A * | 12/2000 | Stava | ............... | B23K 9/0216 219/130.21 |
| 6,906,284 B2 * | 6/2005 | Kim | ............... | B23K 9/095 219/130.21 |
| 8,274,012 B2 * | 9/2012 | Yamazaki | ............. | B23K 9/073 219/130.21 |
| 8,581,146 B2 * | 11/2013 | Daniel | ............ | B23K 9/124 219/137 R |
| 8,604,386 B2 | 12/2013 | Mehn et al. | | |
| 8,803,034 B2 * | 8/2014 | Peters | ............. | B65H 51/10 219/137.41 |
| 9,498,839 B2 * | 11/2016 | Hillen | ............. | B23K 9/125 |
| 9,821,400 B2 * | 11/2017 | Hillen | ............. | B23K 9/095 |
| 9,833,857 B2 * | 12/2017 | Artelsmair | ......... | B23K 9/126 |
| 10,016,834 B2 | 7/2018 | Takayama | | |
| 10,373,517 B2 * | 8/2019 | Becker | ............ | G09B 19/24 |
| 10,438,505 B2 * | 10/2019 | Becker | ............ | B23K 9/32 |
| 10,562,124 B2 * | 2/2020 | Hillen | ............ | B23K 9/295 |
| 2001/0013511 A1 * | 8/2001 | Hong | ............ | B23K 9/1278 219/124.34 |
| 2002/0011474 A1 * | 1/2002 | Sasano | ............ | B23K 9/0953 219/137.71 |
| 2004/0074885 A1 * | 4/2004 | Takatani | ............ | B23K 9/022 219/130.5 |
| 2004/0262280 A1 * | 12/2004 | Kim | ............ | B23K 9/095 219/130.21 |
| 2006/0157533 A1 * | 7/2006 | Onoue | ............ | B25J 9/0018 228/8 |
| 2006/0163225 A1 * | 7/2006 | Takahashi | ............ | B23K 9/124 219/125.11 |
| 2007/0051713 A1 * | 3/2007 | Aimi | ............ | B23K 9/095 219/130.21 |
| 2010/0200553 A1 * | 8/2010 | Yamazaki | ............ | B23K 9/073 219/130.51 |
| 2011/0290771 A1 * | 12/2011 | Fukunaga | ............ | B23K 9/1735 219/130.1 |
| 2012/0074112 A1 * | 3/2012 | Kotera | ............ | B23K 9/0671 219/124.1 |
| 2012/0145689 A1 * | 6/2012 | Hillen | ............ | B23K 9/095 219/130.1 |
| 2012/0145690 A1 * | 6/2012 | Kawamoto | ............ | B23K 9/067 219/130.5 |
| 2012/0199566 A1 * | 8/2012 | Hillen | ............ | B23K 9/095 219/130.1 |
| 2013/0146575 A1 * | 6/2013 | Hillen | ............ | B23K 9/125 219/137.71 |
| 2014/0014638 A1 * | 1/2014 | Artelsmair | ........... | B23K 9/126 219/130.01 |
| 2014/0131332 A1 * | 5/2014 | Henry | ............ | B23K 9/0671 219/130.21 |
| 2014/0263224 A1 * | 9/2014 | Becker | ............ | B23K 9/0956 219/124.5 |
| 2014/0272835 A1 * | 9/2014 | Becker | ............ | G09B 19/24 434/234 |
| 2015/0190875 A1 * | 7/2015 | Becker | ............ | B23K 9/10 700/160 |
| 2015/0375323 A1 * | 12/2015 | Becker | ............ | B23K 9/0953 700/160 |
| 2015/0375324 A1 * | 12/2015 | Becker | ............ | B23K 9/0953 700/212 |
| 2016/0125504 A1 * | 5/2016 | Narayanan | ........ | G06Q 30/0633 705/26.8 |
| 2016/0125592 A1 * | 5/2016 | Becker | ............ | G06T 7/73 348/90 |
| 2016/0125593 A1 * | 5/2016 | Becker | ............ | G06T 7/73 |
| 2016/0125763 A1 * | 5/2016 | Becker | ............ | B23K 9/126 434/234 |
| 2016/0221105 A1 * | 8/2016 | Henry | ............ | B23K 9/124 |
| 2016/0288236 A1 * | 10/2016 | Becker | ............ | B23K 9/0953 |
| 2017/0046974 A1 * | 2/2017 | Becker | ............ | G09B 19/24 |
| 2017/0046977 A1 * | 2/2017 | Becker | ............ | B23K 9/0953 |
| 2017/0050258 A1 * | 2/2017 | Hillen | ............ | B23K 9/295 |

FOREIGN PATENT DOCUMENTS

| | | |
|---|---|---|
| CN | 102905834 A | 1/2013 |
| CN | 103282153 A | 9/2013 |
| CN | 104874900 A | 9/2015 |
| JP | S59144910 A | 8/1984 |
| JP | H06222828 A | 8/1994 |
| JP | H06238449 A | 8/1994 |
| JP | 08-071969 A | 3/1996 |
| JP | 2003053537 A | 2/2003 |
| JP | 2013141695 A | 7/2013 |
| JP | 2014223633 A | 12/2014 |

* cited by examiner

TEACHING SYSTEM AND TEACHING METHOD OF WELDING ROBOT

CROSS-REFERENCE TO RELATED APPLICATION

This application is a new U.S. Patent Application that claims benefit of Japanese Patent Application No. 2017-086317, filed Apr. 25, 2017, the disclosure of this application is being incorporated herein by reference in its entirety for all purposes.

BACKGROUND OF THE INVENTION

1. Field of the Invention

The present invention relates to a teaching system and a teaching method of a welding robot.

2. Description of the Related Art

A teaching method of a robot is generally called a playback method. In the playback method, an operator operates a teach pendant and actually moves a robot to a teaching position by jog feeding, and a robot position corresponding to the teaching position is iteratively stored as positional data in a robot (e.g., see JP 08-071969 A). Alternatively, an operator may perform teaching operation by a hand guide method for manually moving a robot to a teaching position and similarly storing the robot position.

When a robot is an arc welding robot, a welding wire protrudes by a predetermined length from a tip of a welding torch included on an arm tip of the robot. Then, a position in which a tip of the welding wire contacts a subject to be welded (hereinafter simply referred to as a "workpiece") is iteratively stored as a teaching position, as described above, and this teaches a welding path.

SUMMARY OF THE INVENTION

An operator needs to carefully move a robot at a low speed in order to move the robot to an accurate teaching position regardless of the playback method or the hand guide method. Then, when a tip of a welding wire contacts a workpiece, a high degree of expertise and a lot of time are required of the operator to avoid a tip of the welding wire being curved due to application of unexpected force.

Note that when the welding wire is curved, the robot is separated from the workpiece once, and the welding wire is fed. A curved spot of the welding wire is then cut, and the welding wire needs to be set again to protrude by the above-mentioned protruding length. In this way, the number of human-hours necessary for the teaching work increases.

A teaching jig may be used in some cases to avoid a welding wire being curved. In this case, however, the teaching jig needs to be separately prepared, which is complicated, and a position taught by using the teaching jig may be different from an actual position of the tip of the welding wire in some cases.

Thus, a teaching system and a teaching method of a welding robot capable of accurately teaching in a short time while reducing a burden on an operator without a need for a teaching jig are desired.

According to a first aspect of the present disclosure, in a teaching system configured to teach a teaching position of a welding torch, the teaching system is provided that includes: a robot to which the welding torch is attached; a welding wire protruding from the welding torch; a protruding length acquisition section configured to acquire a protruding length of the welding wire; a wire feeding device configured to feed and rewind the welding wire; a contact detection section configured to detect contact of a tip of the welding wire protruding from the welding torch with a teach subject; a control section configured to, if the contact detection section detects the contact of the tip of the welding wire with the teach subject, cause the wire feeding device to rewind the welding wire, if the contact detection section does not detect the contact of the tip of the welding wire with the teach subject, cause the wire feeding device to feed the welding wire, if a current protruding length of the welding wire acquired by the protruding length acquisition section is less than a predetermined length, move the robot in a direction away from the teach subject, if the current protruding length is greater than the predetermined length, move the robot in a direction closer to the teach subject, and if the current protruding length is equal to the predetermined length, stop feeding and rewinding of the welding wire and stop the robot; and a storage section configured to store a stop position of the robot as the teaching position.

In the first aspect, until it is determined that the current protruding length of the welding wire is equal to the predetermined length, both of the motion in which the welding torch is brought closer to and away from the teach subject and the motion in which the welding wire is fed and rewound are automatically performed. This enables accurate teaching in a short time while reducing a burden on an operator without a need for a teaching jig.

The objects, features and advantages as described above, and another objects and advantages of the present invention of the present invention will become more apparent from the following description of the embodiments in connection with the accompanying drawings.

DETAILED DESCRIPTION

Figure 1A:
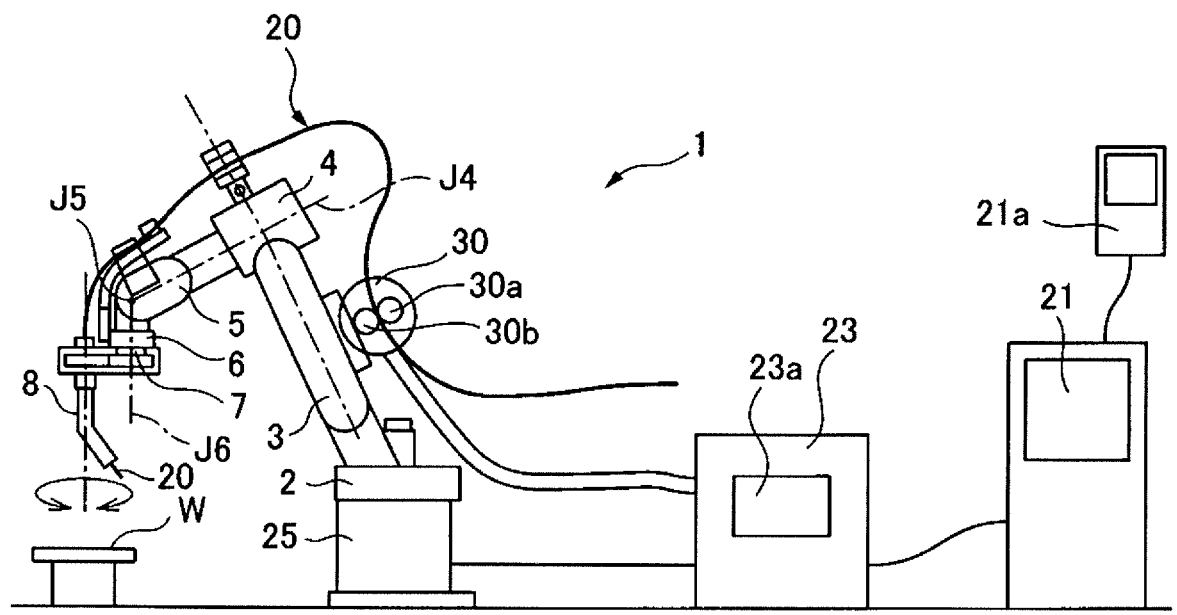
FIG. 1A is a front view illustrating a configuration of a teaching system in a first embodiment.

Embodiments of the present invention will be described below with reference to the appended drawings. Throughout the drawings, corresponding components are denoted by common reference numerals. Scales in the drawings are changed as appropriate in order to facilitate understanding.

Figure 1B:
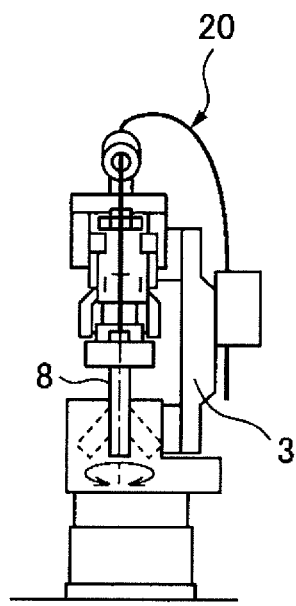
FIG. 1B is a side view of the teaching system illustrated in FIG. 1A.
Figure 2:
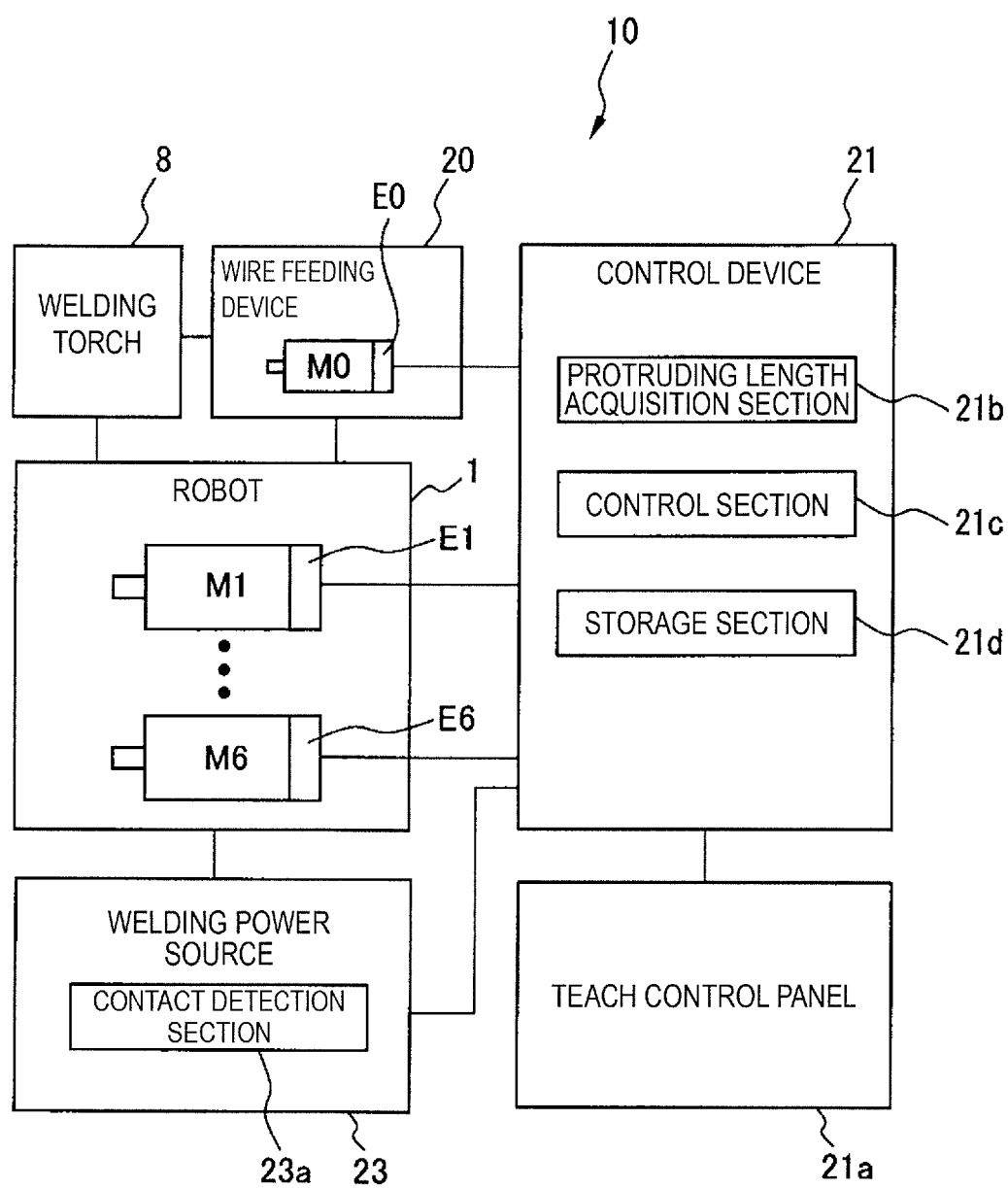
FIG. 2 is a block diagram of the teaching system in the first embodiment.

FIG. 1A is a front view illustrating a configuration of a teaching system 10 in a first embodiment. FIG. 1B is a side view of the teaching system 10 illustrated in FIG. 1A. Furthermore, FIG. 2 is a block diagram of the teaching system 10 in the first embodiment. The teaching system 10 mainly includes a robot 1, a welding wire 20, a protruding length acquisition section 21b, a wire feeding device 30, a contact circuit 23a, a control section 21c, and a storage section 21d, which will be described below in detail.

The robot 1 is an articulated arc welding robot having six degrees of freedom. The robot 1 includes a rotary barrel 2 mounted on a main body base 25, an upper arm 3 pivotably coupled to the rotary barrel 2, a front arm 4 pivotably coupled to a tip side of the upper arm 3, and a welding torch 8 coupled to a tip side of the front arm 4 via a plurality of wrist elements 5, 6, 7. The rotary barrel 2, the upper arm 3, and the front arm 4 are respectively pivotable about a J1 axis (not illustrated), a J2 axis (not illustrated), and a J3 axis (not illustrated) as pivots.

The plurality of wrist elements coupled to the front arm 4 include a first wrist element 5 provided to be rotatable about a J4 axis (first axis) in a longitudinal direction of the front arm 4, a second wrist element 6 that is provided on a tip side of the first wrist element 5 to be rotatable about a J5 axis (second axis) substantially perpendicular to the J4 axis and that crosses the first wrist element 5 at a predetermined bending angle, and a third wrist element 7 provided on a tip side of the second wrist element 6 to be rotatable about a J6 axis (third axis) substantially perpendicular to the J4 axis. The J6 axis is a last axis of the arc welding robot 1 having six axes. The welding torch (working tool) 8 is attached rotatably about an axis that is offset by a fixed amount from and is parallel to the J6 axis on a tip side of the third wrist element 7. The welding wire 20 protrudes from a tip of the welding torch 8.

The wire feeding device 30 that feeds the welding wire 20 to the welding torch 8 is disposed on the upper arm 3 of the robot 1. The wire feeding device 30 includes a pair of rollers 30a, 30b. As illustrated in FIG. 2, one roller 30a is coupled to an output axis of a servo motor M0. Thus, the welding wire 20 passes between the pair of rollers 30a, 30b to be fed and rewound according to a rotation direction of the servo motor M0. The servo motor M0 includes a position detector E0 such as an encoder. A detected value of the position detector E0 is supplied to a robot control device 21. Furthermore, a workpiece W as a teach subject is disposed within an operating range of the robot 1.

The robot control device 21 is a digital computer and includes a CPU, a memory, or the like connected to each other with a bus or the like. The robot control device 21 controls servo motors M1 to M6 of respective axes of the robot 1. Furthermore, the robot control device 21 can similarly control the servo motor M0 of the wire feeding device 30 as a control shaft associated with the robot 1. A teach pendant 21a that causes the robot 1 to perform jog feeding when teaching the robot 1 is connected to the robot control device 21.

The robot control device 21 further includes the protruding length acquisition section 21b that acquires a protruding length of the welding wire 20 protruding from the tip of the welding torch 8. The protruding length acquisition section 21b monitors and iteratively stores a feed amount and a rewind amount of the welding wire 20 on the basis of a detected value obtained in every predetermined cycle by the position detector E0. Therefore, at the time of a teaching operation, the protruding length acquisition section 21b acquires a current protruding length of the welding wire 20 on the basis of a detected value of the position detector E0 and an initial protruding length of the welding wire 20.

A welding power source 23 connected to the robot 1 and the robot control device 21 is a welding power source for arc welding and one for the robot control device 21 is installed separately. The welding power source 23 includes the contact circuit 23a that detects contact of the welding torch 8 with the workpiece. The contact circuit 23a detects the contact of the welding torch 8 with the workpiece when the welding torch 8 contacts the workpiece and a current value suddenly increases. Thus, the contact circuit 23a functions as a contact detection section. The contact circuit 23a may be incorporated in the robot control device 21, and may be installed independently of the welding power source 23 and the robot control device 21.

The robot control device 21 further includes the control section 21c that, if the contact circuit 23a detects contact of the tip of the welding wire 20 with the workpiece W, causes the wire feeding device 30 to rewind the welding wire 20 and that, if the contact circuit 23a does not detect the contact of the tip of the welding wire 20 with the workpiece W, causes the wire feeding device 30 to feed the welding wire 20, and that, if a current protruding length of the welding wire 20 acquired by the protruding length acquisition section 21b is shorter than a predetermined length, moves the robot 1 in a direction away from the workpiece W and that, if the current protruding length is greater than the predetermined length, moves the robot 1 in a direction closer to the workpiece W and that, if a determination that the current protruding length is equal to the predetermined length, stops feeding and rewinding of the welding wire 20 and stops the robot 1, and a storage section 21d, such as a memory, that stores a stop position of the robot 1 as a teaching position. Note that it is assumed that the stop position of the robot 1 includes an orientation of the robot 1 in addition to a position of the robot 1.

At the time of a teaching operation, an operator moves the robot 1 by the teach pendant 21a or hand guide and iteratively determines a position of the tip of the welding wire 20 protruding from the tip of the welding torch 8 at a desired teaching position of the workpiece. Alternatively, an operator may move the robot 1 as described above and determine a position of the workpiece gripped by the robot 1 relative to the welding torch fixed to a predetermined position.

Figure 3A:
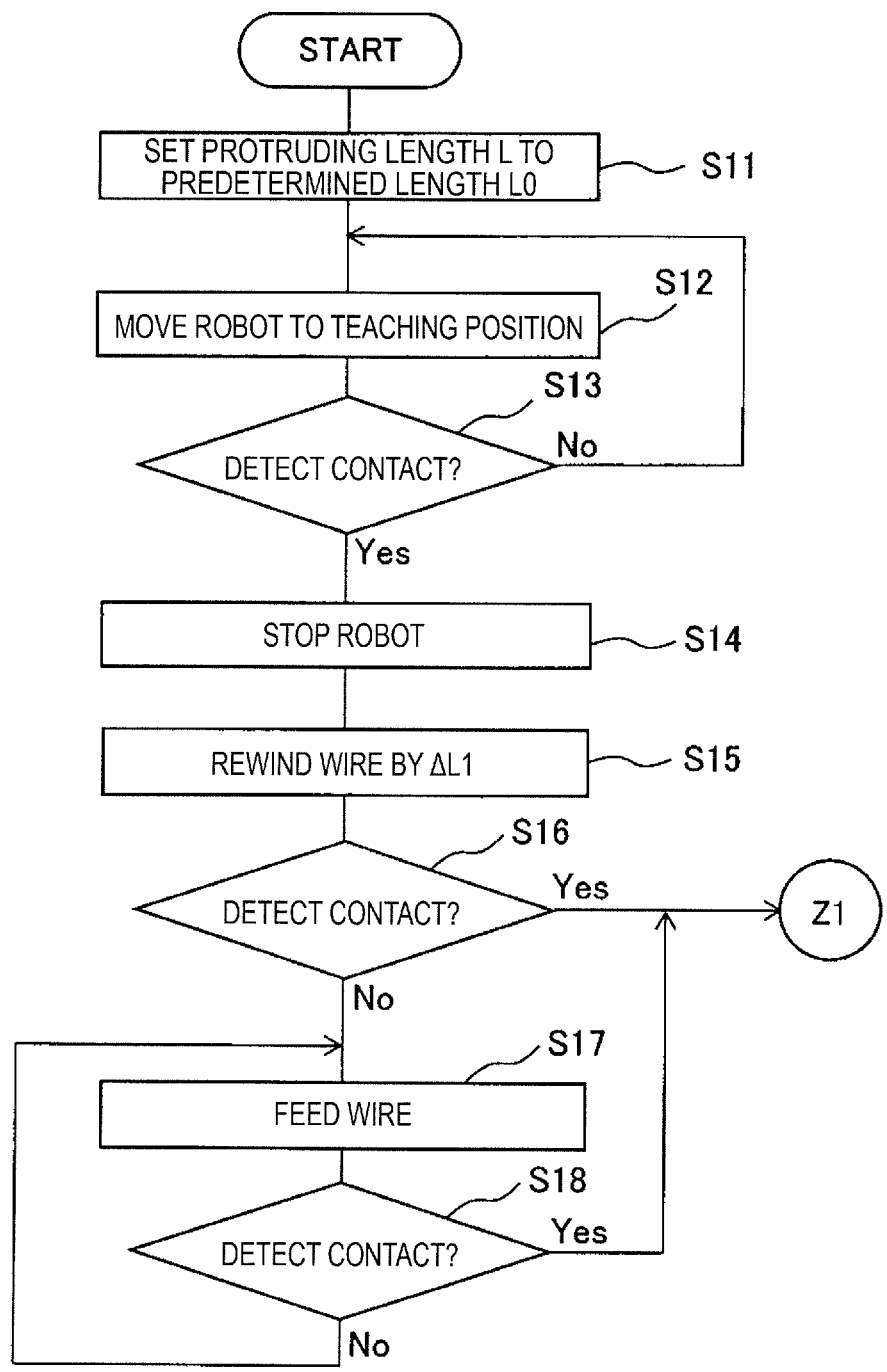
FIG. 3A is a first flowchart illustrating motions of the teaching system.
Figure 3B:
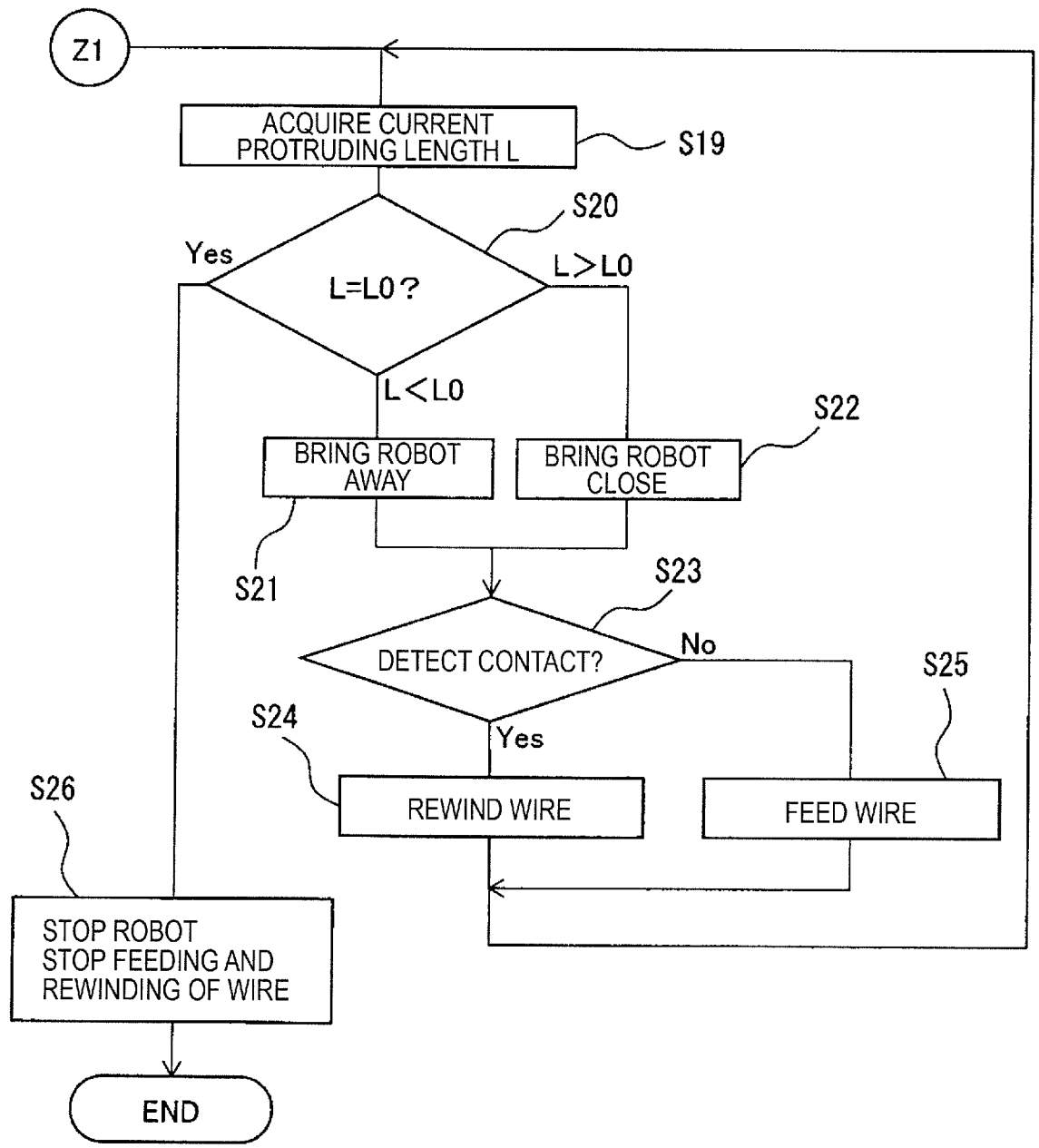
FIG. 3B is a second flowchart illustrating the motions of the teaching system.

FIGS. 3A and 3B are flowcharts illustrating motions of the teaching system. Hereinafter, the teaching system and the teaching method are described with reference to these drawings.

First, in a step S11, an operator sets a protruding length L of the welding wire 20 protruding from the tip of the welding torch 8 to a predetermined length L0, for example, 20 mm. A protruding length after the welding wire 20 protruding from the tip of the welding torch 8 is cut by a general wire cutter is preferably set to the predetermined length L0. Alternatively, the wire feeding device 30 may be set in motion such that the operator can acquire the predetermined length L0 previously obtained by experiment or the like. Note that the predetermined length L0 is stored in the storage section of the robot control device 21.

Then, in a step S12, the operator moves the robot 1 and the welding torch 8 attached to the robot 1 to a desired teaching position above the workpiece W while keeping a desired welding orientation of the robot 1 by using the teach pendant 21a or the hand guide operation. These steps S11 and S12 are carried out by the operator. It is assumed that steps S13 to S26 below are automatically carried out.

In the step S13, the contact circuit 23a detects whether the tip of the welding wire 20 protruding from the welding torch 8 contacts the workpiece W. In a case where the contact is not detected, processing returns to the step S12 and is repeated until the contact is detected. In a case where the contact is detected, processing proceeds to the step S14 and the robot 1 is automatically stopped. In this way, the welding torch 8 attached to the robot 1 is also stopped.

Then, in the step S15, the wire feeding device 30 rewinds the welding wire 20 by a predetermined minute length ΔL1. Note that it is assumed that the predetermined minute length ΔL1 is shorter than the predetermined length L0, and a rewind rate in the step S15 is higher than a jog feed rate of the robot 1. The processing illustrated in the step S14 and the processing illustrated in the step S15 are preferably performed simultaneously. Note that due to a slight time lag in the contact detection in the step S13, the robot 1 coasts when the robot 1 being stopped in the step S14, and, therefore, a distance between the tip of the welding wire 20 and the workpiece W is often less than or equal to the predetermined length L0.

Then, in the step S16, the contact circuit 23a detects again whether the tip of the welding wire 20 contacts the workpiece W. Then, in a case where the contact is not detected, proceed to the step S17. In the step S17, the wire feeding device 30 feeds the welding wire 20 at a predetermined feed rate. In the step S17, a feed amount of the welding wire 20 is not set. Then, in the step S18, the contact circuit 23a detects again whether the tip of the welding wire 20 contacts the workpiece W. In a case where the contact is not detected, return to the step S17 and the welding wire 20 is fed until the contact is detected. In a case where the contact is detected in the step S16 and the step S18, proceed to the step S19.

In the step S19, the protruding length acquisition section 21b acquires a rewind amount ΔL1 of the welding wire 20 rewound in the step S15 and/or a feed amount of the welding wire 20 fed until the contact is detected in the steps S17, S18. Then, the protruding length acquisition section 21b acquires a current protruding length L of the welding wire 20 on the basis of the predetermined length L0, and the rewind amount ΔL1 and/or the feed amount of the welding wire 20.

Figure 4A:
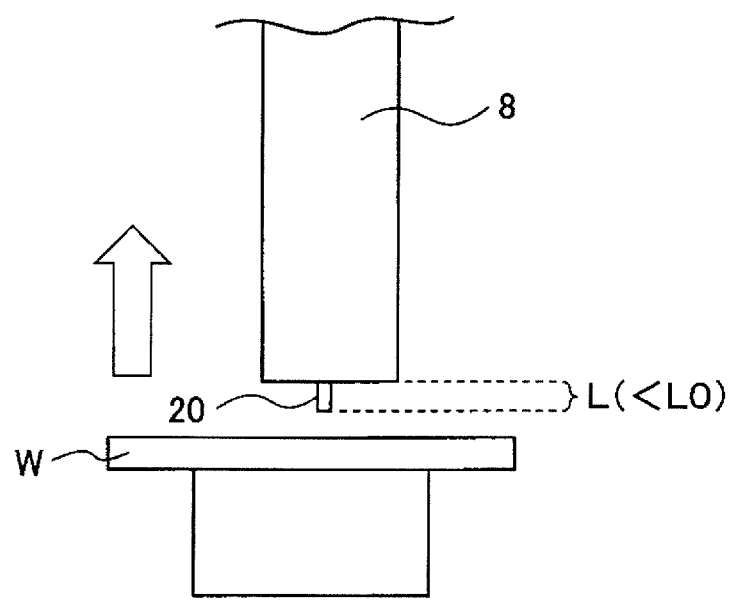
FIG. 4A is an enlarged diagram of a welding torch and a workpiece.
Figure 4B:
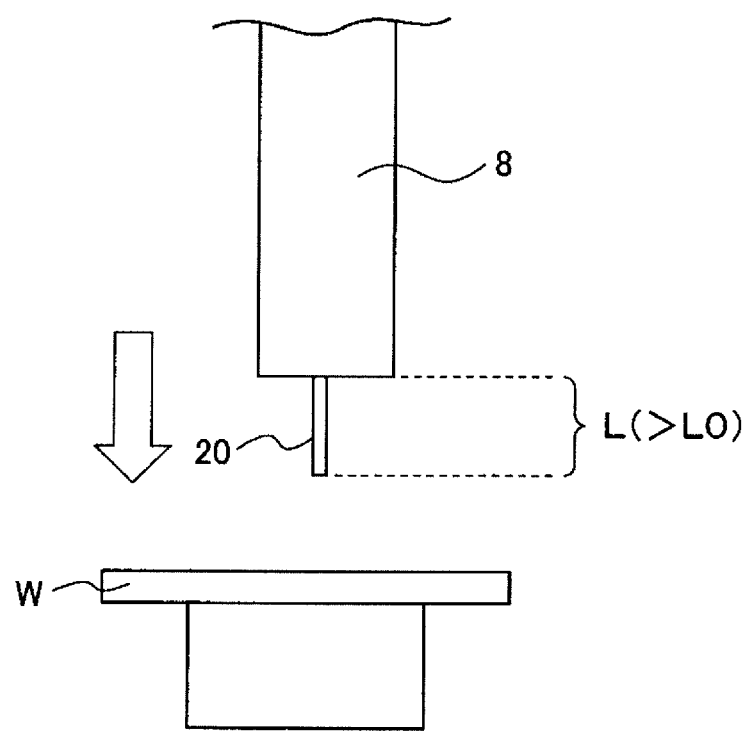
FIG. 4B is another enlarged diagram of the welding torch and the workpiece.

Then, in the step S20, it is determined whether the current protruding length L is equal to the predetermined length L0. Herein, FIGS. 4A and 4B are enlarged diagrams of the welding torch and the workpiece. In a case where the current protruding length L is less than the predetermined length L0 as illustrated in FIG. 4A, the robot 1 and the welding torch 8 attached to the robot 1 are moved in the direction away from the workpiece W in the step S21.

In a case where the current protruding length L is greater than the predetermined length L0 as illustrated in FIG. 4B, the robot 1 and the welding torch 8 attached to the robot 1 are moved in the direction closer to the workpiece W in the step S22. In the steps S21 and S22, a movement amount of the robot 1 and the welding torch 8 is not set.

Then, in the step S23, the contact circuit 23a detects again whether the tip of the welding wire 20 contacts the workpiece W. Then, in a case where the contact is detected, the wire feeding device 30 rewinds the welding wire 20 at a predetermined rewind rate in the step S24. The predetermined rewind rate may be less than or equal to the rewind rate in the step S15. In a case where the contact is not detected, the wire feeding device 30 feeds the welding wire 20 at a predetermined feed rate in the step S25. Note that a rewind amount of the welding wire 20 in the step S24 and a feed amount of the welding wire 20 in the step S25 are not set.

Subsequently, return to the step S19. Then, the processing in the step S19 to the step S25 is repeated until it is determined that the current protruding length L is equal to the predetermined length L0 in the step S20. If it is determined that the current protruding length L is equal to the predetermined length L0 in the step S20, proceed to the step S26. In the step S26, the robot 1 and the wire feeding device 30 are automatically stopped. In this way, the welding torch 8 attached to the robot 1 is also stopped, and the welding wire 20 is not fed and rewound.

When the robot 1 and the wire feeding device 30 are stopped in the step S26, the tip of the welding wire 20 contacts the workpiece W while the welding wire 20 protrudes by the predetermined length L0 from the tip of the welding torch 8. Thus, a stop position of the robot 1 in this state is taught as a teaching position and stored in the storage section 21d. Subsequently, the operator moves the robot 1 toward a next teaching position and iteratively repeats the processing described above. Accordingly, a welding path is taught.

In this way, in the step S20 to the step S22, control of the robot 1 is performed such that the robot 1 is moved in the direction away from the workpiece W, if the current protruding length L of the welding wire 20 is less than the predetermined length L0, and such that the robot 1 is moved in the direction closer to the workpiece W, if the current protruding length L is greater than the predetermined length L0. Furthermore, in the step S23 to the step S25, control (first control) of the welding wire 20 is performed such that the welding wire 20 is rewound, if it is detected that the tip of the welding wire 20 contacts the workpiece W, and such that the welding wire 20 is fed, if it is detected that the tip of the welding wire 20 does not contact the workpiece W.

For the control of the robot 1 described above, a movement amount of the robot 1 is not set, and, for the control of the welding wire 20, a feed amount and a rewind amount of the welding wire 20 are not set. Then, until it is determined that the current protruding length L of the welding wire 20 is equal to the predetermined length L0, the robot 1 continues to be moved in the direction away from the workpiece W and/or the direction closer to the workpiece W, and the welding wire 20 continues to be rewound and/or fed.

Therefore, in the first embodiment, a teaching position can be automatically decided by repeatedly carrying out the control of the robot 1 and the control of the welding wire 20 described above until it is determined that the current protruding length L is equal to the predetermined length L0. In this case, a teaching jig is not needed and the number of man-hours is reduced, so that a teaching work can be performed in a short time. Furthermore, an operator only needs to move the robot 1 to a teaching position, so that a burden on the operator can also be reduced.

Figure 5:
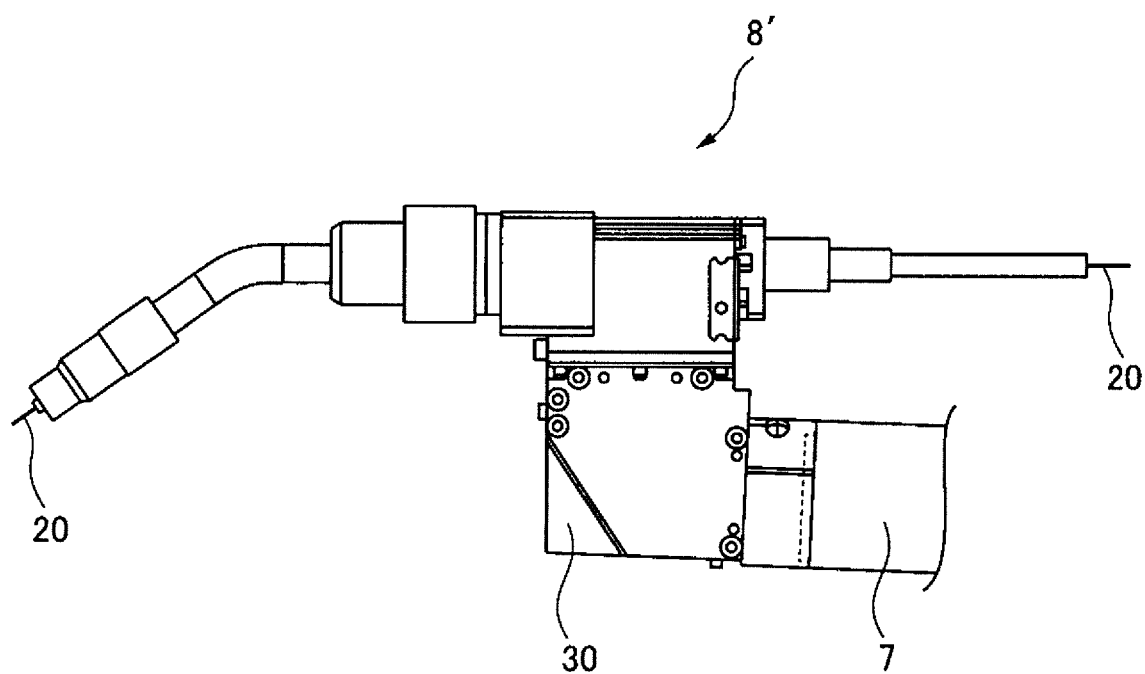
FIG. 5 is a side view of a servo torch.

By the way, in FIG. 1 or the like, the wire feeding device 30 is attached to the upper arm 3 of the robot 1, and the welding torch 8 is attached to the robot 1. However, a servo torch 8' illustrated in FIG. 5 instead of the welding torch 8 may be attached to the robot 1. As illustrated in FIG. 5, the wire feeding device 30 is incorporated in the servo torch 8'. The case where the servo torch 8' is used is included in the scope of the present disclosure.

For your information, the CPU of the control device 21 may act as the protruding length acquisition section 21b and the control section 21c. In addition, the memory of the control device 21 may act as the storage section 21d.

Aspects of the Disclosure

According to a first aspect, in a teaching system (10) configured to teach a teaching position of a welding torch (8), the teaching system is provided that includes: a robot (1) to which the welding torch is attached; a welding wire (20) protruding from the welding torch; a protruding length acquisition section (21b) configured to acquire a protruding length of the welding wire; a wire feeding device (30) configured to feed and rewind the welding wire; a contact detection section (23a) configured to detect contact of a tip of the welding wire protruding from the welding torch with a teach subject; a control section (21c) configured to, if the contact detection section detects the contact of the tip of the welding wire with the teach subject, cause the wire feeding device to rewind the welding wire, if the contact detection section does not detect the contact of the tip of the welding wire with the teach subject, cause the wire feeding device to feed the welding wire, if a current protruding length of the welding wire acquired by the protruding length acquisition section is less than a predetermined length, move the robot in a direction away from the teach subject, if the current protruding length is greater than the predetermined length, move the robot in a direction closer to the teach subject and, if the current protruding length is equal to the predetermined length, stop feeding and rewinding of the welding wire and stop the robot; and a storage section (21d) configured to store a stop position of the robot as the teaching position.

According to a second aspect, in a teaching method for teaching a teaching position of a welding torch (8), the teaching method is provided that includes: protruding a welding wire (20) by a predetermined length from the welding torch attached to a robot (1); moving the robot toward the teach subject (W); determining whether a tip of the welding wire contacts the teach subject; if it is determined that a determination that the tip of the welding wire contacts the teach subject, stopping the robot and rewinding the welding wire by a predetermined amount, and further determining whether the tip of the welding wire contacts the teach subject; if it is determined that the tip of the welding wire does not contact the teach subject, feeding the welding wire until the tip of the welding wire contacts the teach subject; if it is determined that the tip of the welding wire contacts the teach subject, acquiring a current protruding length of the welding wire; if the current protruding length of the welding wire is less than a predetermined length, moving the robot in a direction in which the welding torch is brought away from the teach subject and performing a first control; if the current protruding length of the welding wire is greater than the predetermined length, moving the robot in a direction in which the welding torch is brought closer to the teach subject and performing the first control; if the current protruding length of the welding wire is equal to the predetermined length, stopping feeding and rewinding of the welding wire and stopping the robot; and storing a stop position of the robot as the teaching position; the first control including further determining whether the tip of the welding wire contacts the teach subject in the first control, and, if it is determined that the tip of the welding wire contacts the teach subject, rewinding the welding wire and, if it is determined that the tip of the welding wire does not contact the teach subject, feeding the welding wire.

According to a third aspect, in the second aspect, the first control is repeatedly performed until it is determined that the current protruding length of the welding wire is equal to the predetermined length.

Effects of Aspects

In the first to third aspects, until it is determined that the current protruding length of the welding wire is equal to the predetermined length, both of the motion in which the welding torch is brought closer to and away from the teach subject and the motion in which the welding wire is fed and rewound are automatically performed. This enables accurate teaching in a short time while reducing a burden on an operator without a need for a teaching jig.

Although the present invention has been described using a representative embodiment, it will be clear to one skilled in the art that the above-described variations, as well as other modifications, omissions, and additions, can be made without departing from the scope of the present invention.

The invention claimed is:

1. A teaching system configured to teach a teaching position of a welding torch, the teaching system comprising:
   a robot to which the welding torch is attached;
   a welding wire protruding from the welding torch;
   a wire feeding motor configured to feed and rewind the welding wire;
   a contact detection circuit configured to detect contact of a tip of the welding wire protruding from the welding torch with a teach subject; and
   a controller configured to:
   1) move the robot to a teaching position until the contact detection circuit detects contact of the tip of the welding wire with the teach subject,
   2) cause the wire feeding motor to rewind the welding wire, when the contact detection circuit detects the contact of the tip of the welding wire with the teach subject in step (1),
   3) cause the wire feeding motor to feed the welding wire, when the contact detection circuit does not detect the contact of the tip of the welding wire with the teach subject after the rewind in step (2),
   4) when after step (2) or step (3):
      a) determine a protruding length of the welding wire,
      b) compare the protruding length of the welding wire to a predetermined length:
         b1) when the protruding length is less than the predetermined length, move the robot in a direction away from the teach subject,
         b1i) when the contact detection circuit detects the contact of the tip of the welding wire with the teach subject after step (b1), cause the wire feeding motor to rewind the welding wire and repeat step (4),
         b1ii) when the contact detection circuit does not detect the contact of the tip of the welding wire with the teach subject after step (b1), cause the wire feeding motor to feed the welding wire and repeat step (4),
         b2) when the protruding length is greater than the predetermined length, move the robot in a direction closer to the teach subject,
         b2i) when the contact detection circuit detects the contact of the tip of the welding wire with the teach subject after step (b2), cause the wire feeding motor to rewind the welding wire and repeat step (4),
         b2ii) when the contact detection circuit does not detect the contact of the tip of the welding wire with the teach subject after step (b2), cause the wire feeding motor to feed the welding wire and repeat step (4), and
         b3) when the protruding length is equal to the predetermined length, stop feeding and rewinding of the welding wire and stop the robot, and store a stop position of the robot as the teaching position.

2. A teaching method for teaching a teaching position of a welding torch attached to a robot, the welding torch having a welding wire protruding from the welding torch, the teaching method comprising steps of:
   1) move, by a controller, the robot to a teaching position until a contact detection circuit detects contact of a tip of the welding wire with the teach subject, 2) cause, by the controller, a wire feeding motor to rewind the welding wire, when the contact detection circuit detects the contact of the tip of the welding wire with the teach subject in step (1),
3) cause, by the controller, the wire feeding motor to feed the welding wire, when the contact detection circuit does not detect the contact of the tip of the welding wire with the teach subject after the rewind in step (2),
4) when after step (2) or step (3):
   a) determine, by the controller, a protruding length of the welding wire,
   b) compare the protruding length of the welding wire to a predetermined length:
      b1) when the protruding length is less than the predetermined length, move, by the controller, the robot in a direction away from the teach subject,
         b1i) when the contact detection circuit detects the contact of the tip of the welding wire with the teach subject after step (b1), cause the wire feeding motor to rewind the welding wire and repeat step (4),
         b1ii) when the contact detection circuit does not detect the contact of the tip of the welding wire with the teach subject after step (b1), cause the wire feeding motor to feed the welding wire and repeat step (4),
      b2) when the protruding length is greater than the predetermined length, move, by the controller, the robot in a direction closer to the teach subject,
         b2i) when the contact detection circuit detects the contact of the tip of the welding wire with the teach subject after step (b2), cause the wire feeding motor to rewind the welding wire and repeat step (4),
         b2ii) when the contact detection circuit does not detect the contact of the tip of the welding wire with the teach subject after step (b2), cause the wire feeding motor to feed the welding wire and repeat step (4), and
      b3) when the protruding length is equal to the predetermined length, stop, by the controller, feeding and rewinding of the welding wire and stop the robot, and store, by the controller, a stop position of the robot as the teaching position.

3. The teaching method of claim 2,
wherein steps (a)-(b) are repeatedly performed until it is determined that the current protruding length of the welding wire is equal to the predetermined length.

\* \* \* \* \*